July 29, 1969 H. W. HULTS Re. 26,636

POSITIVE ACTION SWITCHES WITH IMPROVED SLIDING CONTACT SUPPORTING RAIL STRUCTURE

Original Filed March 16, 1966

Inventor
Harold W. Hults
By Wm. A. Autio
Attorney

United States Patent Office

Re. 26,636
Reissued July 29, 1969

26,636
POSITIVE ACTION SWITCHES WITH IMPROVED SLIDING CONTACT SUPPORTING RAIL STRUCTURE

Harold W. Hults, New Berlin, Wis., assignor to Cutler-Hammer, Inc., Milwaukee, Wis., a corporation of Delaware Original No. 3,339,032, dated Aug. 29, 1967, Ser. No. 534,865, Mar. 16, 1966. Application for reissue Oct. 25, 1967, Ser. No. 682,696
Int. Cl. H01h *15/18, 21/04*
U.S. Cl. 200—16 9 Claims

Matter enclosed in heavy brackets [ ] appears in the original patent but forms no part of this reissue specification; matter printed in italics indicates the additions made by reissue.

*ABSTRACT OF THE DISCLOSURE*

*A manually operable toggle switch having positive action, that is, an unyielding connection from the operating lever to the movable contact, through at least a portion of lever movement to forcibly break open sticking or welding contacts combined with snap action and free space between stationary contacts to prevent sliding contact from tracking arcing products therebetween.*

*Background of the invention*

This invention relates to positive action switches and more particularly to manually operable switches of the type having a positive and unyielding connection between the operating member and the movable contact for a sufficient portion of the operating member movement whereby positive force may be applied to open the contacts combined with snap action and improved contact means therefor.

While not limited thereto, the invention is especially applicable to toggle switches of the self-enclosed type.

*Summary of the invention*

An object of the invention is to provide improved positive action switches.

A more specific object of the invention is to provide improved contact means for positive action switches.

Another specific object of the invention is to provide improved switch structures affording positive action followed by snap action for switch operation together with use of sliding contact action for maintaining the contacts clean.

Another specific object of the invention is to provide a positive action and snap action switch with improved bridging contact means.

Another specific object of the invention is to provide a combined positive action and snap action switch with improved bridging contact means affording sliding double break without having the movable contacting portion rub on any insulation in the open position.

Another specific object of the invention is to provide a switch of the aforementioned type which is readily adapted for single-pole double-throw or single-pole triple-throw construction with minimum modification.

Another specific object of the invention is to provide a positive action switch structure which is especially adapted for hermetic sealing.

Other objects and advantages of the invention will hereinafter appear.

*Brief description of the drawings*

These and other objects and advantages of the invention and the manner of obtaining them will best be understood by reference to the following description of an exemplary embodiment thereof taken in conjunction with the accompanying drawings, wherein.

*Description of the preferred embodiments*

Figure 1:
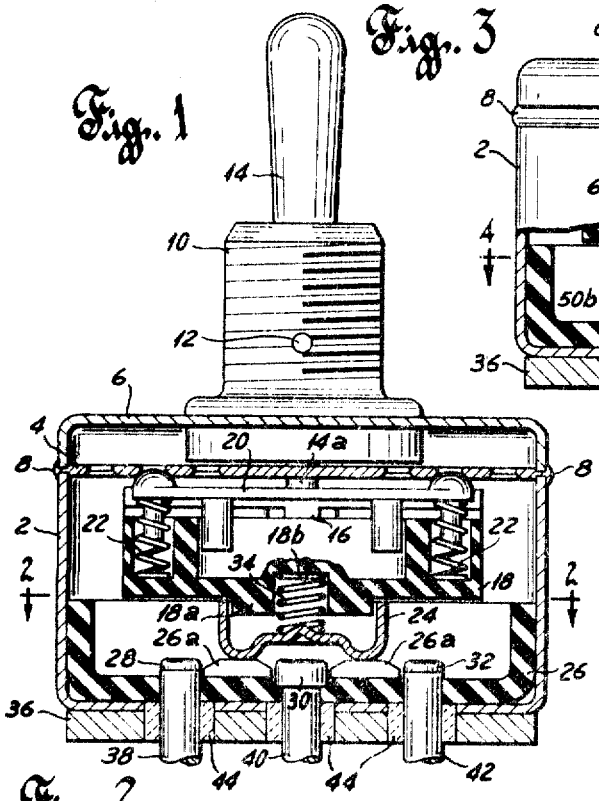
FIGURE 1 is a front elevational view partly in section showing a single-pole double-throw toggle switch in its center open position.

Referring to FIG. 1, there is shown a toggle switch of the single-pole double-throw type having a center open position. This switch is provided with a substantially rectangular metal housing comprising a cup-shaped base portion 2 open at the top on the rim of which rests the reduced edge portion of an indexing plate 4 and a relatively shallow cup-shaped cover portion 6 inverted over the base portion so that its rim rests on the reduced edge portion of indexing plate 4. The adjacent rims of the base portion and cover portion are secured to one another as by welding over and to the thin edge of *the* indexing plate, this weld being depicted by 8 in FIG. 1.

Cover portion 6 is provided with a large hole at its center into which is rigidly secured a bushing 10 having a cross pin 12 therethrough for pivoting therein a toggle lever 14. The toggle lever has a handle portion extending upwardly from the bushing so that it can be grasped by the hand to operate the switch. The toggle lever has a lower end 14a projecting into the housing as shown in FIG. 1 and terminating in a spherical end portion extending into a hole in a laterally reciprocable driving plate 16. This hole in the driving plate is round except for approximately its upper half which is frusto-conical in form to provide clearance as the toggle lever is rocked from its middle position shown in FIG. 1 to either the left or right side. For an illustration and description of driving plate 16 and its cooperation with the other parts, reference may be had to H. W. Hults copending application, Ser. No. 534,719, filed concurrently herewith, *now Patent No. 3,333,074 dated July 25, 1967*. For present purposes, it might be sufficient to observe that driving plate 16 is mounted on an actuator block 18 for limited movement relative thereto in opposite lateral directions during which one or the other snap-action helical spring is compressed and for further movement during which the driving plate engages a side of the spring pocket on the actuator block to apply positive force through the latter to the movable contact.

A pair of indexing detent plungers 20 are mounted on the actuator block in front of and behind the driving plate for holding the actuator block in its center position or in one of two opposite end positions. As shown in FIG. 1, the indexing detent plungers are held in slots in the actuator block and are biased upwardly by helical compression springs 22 so that the hemispherical portions on top of the opposite ends thereof bear against the indexing plate and are received in downwardly beveled holes in the latter. Since there are two hemispherical portions on each of the two indexing detent plungers, the indexing plate is provided with four sets of three holes each to receive them.

Bushing 10 is threaded externally so that it can be inserted in a hole in a mounting panel and a nut threaded thereon to secure the switch to the panel.

Figure 2:
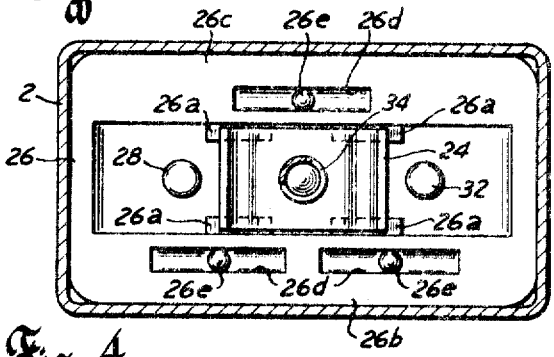
FIG. 2 is a cross-sectional view showing a top view of the contacts along line 2—2 of FIG. 1.

The switch shown in FIGS. 1 and 2 is provided with sliding contacts of the bridging type, the contacting portions of which are completely freed from contact with anything in the open position of the switch. This construction has clear advantages over former types wherein the contacting portions of the bridging contacts rode over or rubbed on insulation between the stationary contacts with its inherent problems of drawing conductive arcing products along such insulation having a tendency to establish short circuits or leakage paths between stationary contacts. Also, this prevents insulating particles from contaminating the contact surface which would result in open circuit. For this purpose, bridging contact 24 is provided with side rails 26a in the inner walls at the junction thereof with the bottom of insulating base 26 on which the edges of the movable bridging contact ride to maintain its contacting portions free of any contact between the stationary contacts.

These side rails are at the same level as the upper surface of the stationary contacts. This allows closing and opening of the contacts with only lateral movement of the movable contact. Since no significant up and down movement of the movable contact takes place, this side rail feature enables operation of the switch with less force and also enables building of the switch into a smaller and more compact package.

Base 26 lines the interior of base portion 2 of the housing through approximately the lower half and bottom of base portion 2. Insulating base 26 has molded integrally therewith a pair of abutments or side rails 26a on each of the front and rear interior walls, respectively, in alignment with one another at points between stationary contacts 28, 30 and 32 as shown in FIG. 2 for supporting the bridging contact in its open position as aforementioned. This insulating base has rather thick front and rear walls 26b and 26c as shown in FIG. 2 to provide flat surfaces on which actuator block 18 will slide. These flat surfaces are provided with rounded grooves 26d each having a ball bearing 26e therein extending slightly above the upper flat surface of the base portion to reduce the friction and enhance the sliding of the actuator block when the switch is operated. The actuator block has a flat lower surface which rolls on these ball bearings to insure snap action as soon as the hemispherical portions of indexing plungers 20 are cammed out of the beveled holes in indexing plate 4.

Actuator block 18 is molded of insulating material and is similar to that shown and described in my copending application aforementioned except that the cam slot has been eliminated from the lower surface thereof and replaced by a downwardly extending portion 18a of rather shallow height but high enough to receive the movable bridging contact so that the left and right shoulders thereof abut the upstanding arms of the movable contact without substantial play or lost motion therebetween and to permit a small amount of vertical movement of the movable contact as it slides from the side rails onto the contacts. A hole 18b extends upwardly from the center of downwardly extending portion 18a for receiving an helical compression spring 34 for biasing the movable contact downwardly against the stationary contacts thereby to provide the required contact pressure. As shown in FIG. 1, bridging contact 24 is generally U-shaped with the two upstanding arms embracing the downward projection on the actuator block to transmit positive action from the actuator block to the movable contact. The lower portion or bottom of the U-shaped contact is bent up or offset up to provide two rounded contacting points on opposite sides thereof. Also this offset portion has a raised nib at its center to locate and retain the lower end of compression spring 34.

As shown in FIG. 2, movable contact 24 is almost as wide as the switch cavity within base 26 with only a small amount of clearance to permit free movement of the movable contact to the left or right. Except for side rails 26a hereinbefore mentioned, the front and rear walls of the base within the cavity are vertical and smooth to keep the movable contact upright as shown in FIG. 1.

As shown in FIG. 1, a steel plate 36 is rigidly secured as by welding to the bottom of the switch base portion 2 of the metal housing to thicken the bottom thereof. This plate has holes coextensive with and in registration with the holes in the metal base portion which are substantially larger than the round rod-like connectors 38, 40 and 42 extending therethrough from the respective stationary contacts. Smaller holes are provided in insulating base 26 to snugly surround connectors 38, 40 and 42. The larger holes in plate 36 and in base portion 2 are provided to accommodate electrical insulation to insulate the connectors from the housing. The holes in the plate and base portion are filled with vitreous or ceramic material 44 or the like which has the qualities of strength, sealing and electrical insulating. As will be apparent, this material rigidly secures connectors 38, 40 and 42 to the base portion of the housing and electrically insulates them from the latter. These connectors are adapted to be connected to external terminals by which the switch is connected to the circuit in which it is used.

When the toggle lever is pivoted to operate the switch, it slides driving plate 16 relative to actuator block 18 and compresses one of the snap-action helical springs between the driving plate and actuator block for a limited amount of movement. The details of these springs and driving plate are shown more completely in my copending application aforementioned. When this spring has been compressed a certain amount, the driving plate then engages an abutment such as a side of the spring pocket on the actuator block to afford an unyielding connection from the toggle lever to the movable contact.

It will be apparent that after the toggle lever has been moved enough to compress the snap-action spring, positive action is applied to slide the actuator block and movable bridging contact 24 mounted thereon. This positive action then causes the hemispherical portions of the indexing plungers to be cammed out of the holes in the indexing plate whereafter the snap-action spring accelerates the actuator block and if the toggle lever was being operated clockwise, the snap-action spring causes the movable contact to slide off the side rails 26a and to bridge stationary contacts 28 and 30. If the toggle lever had been moved in the opposite direction, bridging of stationary contacts 30 and 32 would have taken place. The switch contacts are arranged and stationary contact 30 is larger than the other two so that the bridging contact will come to rest on different points of contact 30. Thus, clockwise operation of the toggle lever will cause the bridging contact to come to rest on substantially the center of contact 28 and on the right-hand portion of contact 30. In the other position resulting from counterclockwise movement of the toggle lever, the movable contact will come to rest on substantially the center portion of contact 32 and on the left-hand portion of contact 30. In this manner, double wear of a single point of the center contact 30 will be avoided. When the toggle lever is now moved back toward the center position, the positive action is applied to break any weld or sticking between the movable and stationary contacts to insure that the switch will be opened.

The modification shown in FIGS. 3 to 6 provides a single-pole triple-throw switch. Reference characters like those in FIGS. 1 and 2 are used thereon for like parts.

This version of switch requires a base 50 of insulating material which has a larger cavity therein to accommodate an additional row of stationary contacts and a second movble bridging contact. As shown in FIGS. 3 to 6, there is provided a first row of three stationary contacts 52, 54 and 56 like those in FIGS. 1 and 2 except that they are near the front of the base portion 50 to provide room behind them for a second row of stationary contacts 58 and 60. As shown in FIG. 4, contacts 58 and 60 are staggered relative to the first row or are placed opposite the spaces between the contacts in the first row so that one movable contact will engage them in the center position of the toggle lever. A first movable bridging contact 62 is provided for engaging a pair of the stationary contacts in the first row when the toggle lever is in its left or right position. A second movable bridging contact 64 is provided for engaging the stationary contacts in the second row when the toggle lever is in its center position.

As shown in FIG. 4, base 50 has two *side* abutments [on] *or* side rails 50a at the bottom of the front wall within the cavity along which one edge of bridging contact 62 rides and on which it is supported when the toggle lever is in its center position. These side rails 50a are opposite the spaces between stationary contacts 52–54 and 54–56.

Base 50 also has three *side* abutments or side rails 50b at the bottom of the rear wall within the cavity along which one edge of bridging contact 64 rides and on which it is supported in either left or right position of the toggle lever.

Figure 5:
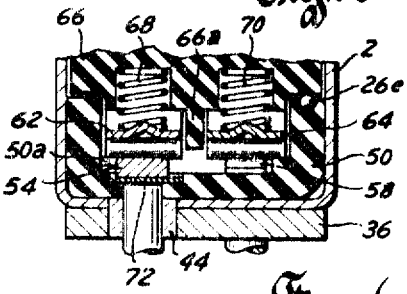
FIG. 5 is a fragmentary cross-sectional view showing the contact structure along line 5—5 of FIG. 4.
Figure 6:
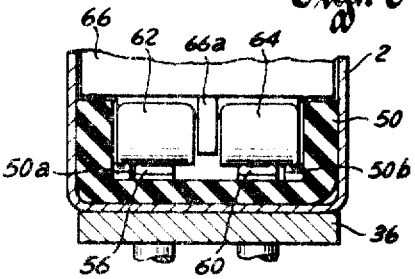
FIG. 6 is a fragmentary cross-sectional view showing the contact structure along line 6—6 of FIG. 4.

Since these side rails support only one edge portion of the movable bridging contacts, it will be apparent that some *side abutment* means must be provided for keeping them from tipping over. This means comprises a downwardly hanging wall 66a integral with actuator block 66 as shown in FIGS. 4, 5 and 6 and as shown in phantom (dotted) lines in FIG. 3. The unstanding arms of the movable contacts will lean against *or abut* opposite sides of this wall which moves with the movable contacts to keep them from dropping at one side between the stationary contacts.

This wall 66a hangs down from a short downward projection 66b which is embraced by the upstanding arms of movable contacts 62 and 64 on opposite sides of integral wall 66a and which keeps the movable contacts in registration with the actuator block while allowing limited vertical movement of the movable contacts. A pair of helical compression springs 68 and 70 are retained in recesses in the actuator block as shown in FIG. 5 and bias the movable contacts against the stationary contacts.

As shown in FIG. 4 in broken lines, stationary contact 54 is connected by a conductive strap 72 to contact 60. For this purpose, insulating base 50 is provided with a diagonal groove in the bottom of its switch cavity for strap 72.

The bottom of the base is provided with four holes through which the connectors of stationary contacts 52, 54, 56 and 58, respectively, extend to external terminals. These connectors are insulated from base portion 2 of the housing and from plate 36 and are rigidly secured in place and sealed to the housing by material 44 as hereinbefore described in connection with FIGS. 1 and 2.

Figure 3:
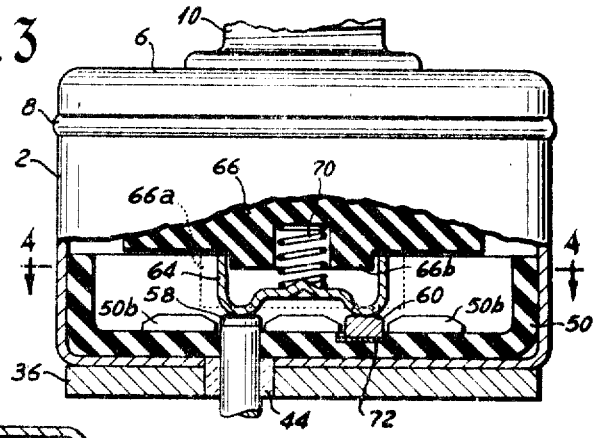
FIG. 3 is a fragmentary front elevational view partly in section showing a single-pole triple-throw toggle switch in its center position along line 3—3 of FIG. 4.
Figure 4:
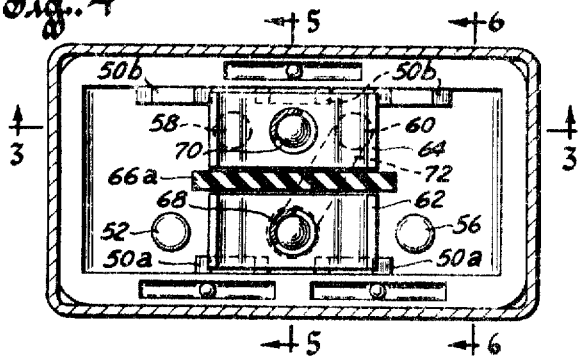
FIG. 4 is a cross-sectional view showing a top view of the contacts along line 4—4 of FIG. 3.

As shown in FIG. 3, stationary contact 60 is not provided with a connector extending through the housing. Instead, contact 60 is only connected through strap 72 to stationary contact 54. This arrangement and connection of stationary contacts makes contact 54 common. That is, in the left position of the movable contacts, bridging contact 62 connects contact 52 to common contact 54. In the center position, bridging contact 64 connects contact 58 to common contact 54 through contact 60 and strap 72. And in the right position, bridging contact 62 connects contact 56 to the common contact.

While the apparatus hereinbefore described is effectively adapted to fulfill the objects stated, it is to be understood that I do not intend to confine my invention to the particular preferred embodiments of positive action switches disclosed, inasmuch as they are susceptible of various modifications without departing from the scope of the appended claims.

*Claims* [I claim]:

1. In an electric switch, the combination comprising:
an insulating base;

stationary contacts mounted in said base in spaced apart relation;
movable bridging contact means;
an actuator block mounted for sliding movement along said base;
means between said actuator block and said movable bridging contact means providing an unyielding connection therebetween in the direction in which said actuator block is moved and resiliently biasing said movable bridging contact means toward said stationary contacts;
a manually operable lever;
means providing an unyielding connection between said lever and said actuator block to transmit positive force for at least a portion of the movement of said lever for closing or opening the contacts if they stick or weld;
means mounting said stationary contacts so that the contacting portions thereof are raised above the surface of the base at points therebetween;
and side abutments for supporting said movable bridging contact means at edge portions thereof when the same is moved off the stationary contacts so that the contacting portions thereof remain clear of any insulating material between the stationary contacts.

2. The invention defined in claim 1, wherein said means providing an unyielding connection comprises:
potential energy storing means effective in response to initial movement of said manually operable lever;
positive action means responsive to further movement of said manually operable lever;
and means responsive during said further movement for rendering said potential energy storing means effective to cause snap-action movement of said actuator block.

3. The invention defined in claim 2, wherein said potential energy storing means comprises:
a pocket in said actuator block;
a helical compression spring in said pocket;
a driving member movable by said manually operable lever and having an arm for compressing said spring during initial movement thereof and lateral arms for engaging a side of said pocket to cause positive movement of said actuator block during further movement of said driving member;
and indexing means for restraining said actuator block during said initial movement and for releasing said actuator block in response to said further movement.

4. The invention defined in claim 3, wherein said indexing means comprises:
a spring biased indexing plunger mounted on said actuator block;
and a stationary indexing plate against which said indexing plunger is biased and allowing cammed release thereof in response to said further movement.

5. The invention defined in claim 1, wherein said movable bridging contact means comprises:
a U-shaped metal strap member having its bottom portion offset upwardly to form two rounded contacting portions and having its upstanding arms embracing a portion of said actuator block for movement therewith;
and a compression spring bearing on said actuator block for biasing said U-shaped member against the stationary contacts to afford contact pressure when the contacts are closed.

6. The invention defined in claim 1, wherein:
said insulating base comprises an elongated cavity therein along the bottom of which said stationary contacts are arranged in alinement;
and said side [rails comprises] *abutments comprise* ridges molded integrally with said base at the junctions of the side walls and the bottom within said cavity and in registration with the spaces between said stationary contacts.

7. The invention defined in claim 1, wherein:

said movable bridging contact means comprises two U-shaped metal strap members, each having its bottom portion offset upwardly to form two rounded contacting portions and having its upstanding arms embracing a protuberance on the bottom of said actuator block for movement therewith;

compression springs bearing on said actuator block for biasing said U-shaped members against the stationary contacts to afford proper contact pressure when the contacts are closed;

*said side abutments comprising* a hanging wall integral with said actuator block between said U-shaped members for supporting the inner sides of the latter [while] *and side rails on which* the outer sides thereof ride [on said side rails] when the contacts are opened; and said stationary contacts comprise two rows thereof arranged for bridging by the respective U-shaped members.

8. The invention defined in claim 7, wherein said two rows of stationary contacts comprise:

three contacts in one row arranged so that one end contact will be bridged by one U-shaped member to the center contact in one extreme position of said manually operable lever and the other end contact will be bridged to said center contact in the other extreme position of said manually operable lever;

and two contacts in the other row arranged to be bridged by the other U-shaped member in the center position of said manually operable lever.

9. The invention defined in claim [2] *8*, wherein said two rows of stationary contacts further comprise:

a connector connecting one of the contacts in said other row to the center contact in the first mentioned row to provide a single-pole triple-throw switch.

References Cited

The following references, cited by the Examiner, are of record in the patented file of this patent or the original patent.

UNITED STATES PATENTS

| | | | |
|---|---|---|---|
| 3,075,062 | 1/1963 | Iaccarino | 200—67 X |
| 3,235,679 | 2/1966 | Schaad et al. | 200—6 X |

ROBERT K. SCHAEFER, Primary Examiner

J. R. SCOTT, Assistant Examiner

U.S. Cl. X.R.

200—68